United States Patent
Anumalasetty et al.

(10) Patent No.: US 9,462,059 B2
(45) Date of Patent: Oct. 4, 2016

(54) LIVE PARTITION MOBILITY WITH SHARED PERSISTENT RESERVATIONS

(71) Applicant: International Business Machines Corporation, Armonk, NY (US)

(72) Inventors: Kiran K. Anumalasetty, Hyderabad (IN); Venkata N. Anumula, Hyderabad (IN); Sudhir Maddali, Hyderabad (IN); Yadagiri Rajaboina, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/091,635

(22) Filed: Apr. 6, 2016

(65) Prior Publication Data

US 2016/0212215 A1 Jul. 21, 2016

Related U.S. Application Data

(63) Continuation of application No. 14/301,591, filed on Jun. 11, 2014.

(51) Int. Cl.
*H04L 29/08* (2006.01)
*H04L 12/925* (2013.01)
*H04L 29/12* (2006.01)

(52) U.S. Cl.
CPC ......... *H04L 67/1097* (2013.01); *H04L 47/722* (2013.01); *H04L 61/1582* (2013.01); *H04L 67/1008* (2013.01)

(58) Field of Classification Search
CPC ........... H04L 67/1097; H04L 67/1008; H04L 47/722; H04L 61/1582
See application file for complete search history.

(56) References Cited

U.S. PATENT DOCUMENTS

| | | | |
|---|---|---|---|
| 7,346,801 B2 | 3/2008 | Brunelle et al. | |
| 8,977,888 B1* | 3/2015 | Bafna | G06F 11/1415 714/4.11 |
| 2011/0125771 A1* | 5/2011 | Gladwin | G06F 17/30067 707/758 |
| 2014/0040410 A1 | 2/2014 | McDowell et al. | |
| 2014/0059302 A1 | 2/2014 | Hayakawa et al. | |
| 2014/0245293 A1* | 8/2014 | Tsirkin | G06F 9/455 718/1 |
| 2015/0365274 A1 | 12/2015 | Anumalasetty et al. | |

OTHER PUBLICATIONS

List of IBM Patents or Patent Applications Treated As Related; Dated May 18, 2016; 2 pages.

* cited by examiner

*Primary Examiner* — Viet Vu
(74) *Attorney, Agent, or Firm* — Alexander G. Jochym

(57) ABSTRACT

According to one embodiment of the present invention, a method is provided. The method may include a computer registering a first instance of a logical partition on a source server with a logical unit and placing a first persistent reservation on the logical unit, wherein the first persistent reservation indicates that only the first instance of the logical partition can hold a reservation on the logical unit. The method may further include the computer registering a second instance of the logical partition on a destination server with the logical unit and downgrading the first persistent reservation, such that the first and second instances of the logical partition can hold persistent reservations on the logical unit. The method may further include the computer placing, by one or more computer processors, a second persistent reservation on the logical unit.

1 Claim, 5 Drawing Sheets

LIVE PARTITION MOBILITY WITH SHARED PERSISTENT RESERVATIONS

BACKGROUND OF THE INVENTION

The present invention relates generally to the field of computer resource virtualization, and more particularly to logical partition mobility between physical computing systems.

Live partition mobility (LPM) allows a system administrator or other user to migrate a logical partition (LPAR), or virtual machine (VM), from one server computer (source server computer), or central electronics complex (CEC), to another CEC (destination server computer) without disrupting the services provided by the LPAR. The LPAR that is being moved in the LPM operation is known as the "mobile partition." The mobile partition accesses necessary storage devices divided into logical units, and identified by logical unit numbers (LUNs) using virtual ports which correspond to physical ports on the host CEC that are connected to a storage area network (SAN). A common requirement for LPM is that the LUN(s) that the mobile partition accesses must be configured for access by both the source server computer and the destination server computer. The source server computer and the destination server computer have access to the same network and SAN(s). Generally, the mobile partition is fully virtualized, which means that the mobile partition has no dedicated physical I/O adapters associated with the mobile partition.

Each virtual connection between the mobile partition and the SAN has two world wide names (WWNs), or world wide port names (WWPNs). One of the WWPNs is a primary WWPN and the other is a secondary WWPN. The mobile partition uses the WWPNs to access one or more LUNs via the SAN. Traditionally, the mobile partition places a reservation on one or more LUNs that it accesses via the SAN. In traditional SAN architectures, reservations are exclusive, which means that one and only one LPAR can reserve a LUN at any point in time. More recently, shared reservations have developed, such as SCSI-3, in which one or more LPARs can access a LUN, with varying priorities and privileges, depending on the specific LPAR.

During traditional LPM operations, a controlling computer, such as a hardware management console (HMC) verifies that the destination server computer has sufficient resources available to support the mobile partition. Once the verification is complete, the HMC copies the mobile partition from the source server computer to the destination server computer. After the copy occurs, the mobile partition copy still existing on the source server computer is using the primary WWPN to access one or more LUNs via the SAN, and holds an exclusive reservation on the LUN(s). The mobile partition copy on the destination server computer uses the alternate WWPN to access the one or more LUNs required by the mobile partition. In order for the mobile partition copy on the destination server computer to establish a reservation on the required LUN(s), the mobile partition copy on the source server computer releases the exclusive reservation held on the LUN(s). Sometime after the mobile partition copy on the source server computer releases the reservation, the mobile partition copy on the destination server computer establishes an exclusive reservation on the required LUN(s) using the alternate WWPN.

SUMMARY

According to one embodiment of the present invention, a method for transferring a logical partition from a source server to a destination server is provided. The method may include a computer registering a first instance of a logical partition on a source server with a logical unit. The method may further include the computer placing a first persistent reservation on the logical unit, wherein the first persistent reservation indicates that only the first instance of the logical partition can hold a reservation on the logical unit. The method may further include the computer registering a second instance of the logical partition on a destination server with the logical unit. The method may further include the computer downgrading the first persistent reservation, such that the first and second instances of the logical partition can hold persistent reservations on the logical unit. The method may further include the computer placing a second persistent reservation on the logical unit.

According to another embodiment of the present invention, a computer program product for transferring a logical partition from a source server to a destination server is provided. The computer program product may include a computer-readable storage medium and program instructions stored on the computer-readable storage medium. The computer-readable storage medium may include program instructions to register a first instance of a logical partition on a source server with a logical unit. The computer-readable storage medium may further include program instructions to place a first persistent reservation on the logical unit, wherein the first persistent reservation indicates that only the first instance of the logical partition can hold a reservation on the logical unit. The computer-readable storage medium may further include program instructions to register a second instance of the logical partition on a destination server with the logical unit. The computer-readable storage medium may further include program instructions to downgrade the first persistent reservation, such that the first and second instances of the logical partition can hold persistent reservations on the logical unit. The computer-readable storage medium may further include program instructions to place a second persistent reservation on the logical unit.

According to another embodiment of the present invention, a computer system for transferring a logical partition from a source server to a destination server is provided. The computer system may include one or more computer processors, a computer-readable storage medium, and program instructions stored on the computer-readable storage medium. The computer-readable storage medium may include program instructions to register a first instance of a logical partition on a source server with a logical unit. The computer-readable storage medium may further include program instructions to place a first persistent reservation on the logical unit, wherein the first persistent reservation indicates that only the first instance of the logical partition can hold a reservation on the logical unit. The computer-readable storage medium may further include program instructions to register a second instance of the logical partition on a destination server with the logical unit. The computer-readable storage medium may further include program instructions to downgrade the first persistent reservation, such that the first and second instances of the logical partition can hold persistent reservations on the logical unit. The computer-readable storage medium may further include program instructions to place a second persistent reservation on the logical unit.

DETAILED DESCRIPTION

Embodiments of the present invention recognize that traditional methods of LPM use exclusive reservations, such that a mobile partition copy on a source computer releases its reservation on a particular storage device (i.e., logical unit) before a mobile partition copy on the destination computer can establish a reservation on the same device. Exclusive reservations mandate that only a single LPAR hold a reservation on a LUN at a time. Because only one LPAR may hold a reservation at a time using exclusive reservations, then during an LPM event, when the mobile partition is present on both the source server computer and the destination server computer, there is a period of time between when the mobile partition copy on the source server computer releases its exclusive reservation and when the mobile partition copy on the destination server computer establishes an exclusive reservation, during which no reservation is held on the LUN. During this window where no reservation is held on the required LUN, a third host system (e.g., another server computer with access to the SAN) can establish an exclusive reservation on the required LUN. If the third host system establishes an exclusive reservation on the required LUN during the window, then the mobile partition copy on the destination server computer will not be able to establish a reservation on the required LUN, and the mobile partition on the destination server computer will receive a reservation conflict error when it tries to establish a reservation on the already reserved LUN. Reservation errors can result in performance degradation and loss of data integrity. In some cases, reservation conflict errors can result in failure of the LPM process. Embodiments of the present invention disclose a method of completing the LPM operation using non-exclusive persistent reservations, such as those existing in the SCSI-3 standard, such that no window exists during which a third host server computer can establish a reservation on the required LUN and disrupt the LPM operation.

Figure 1:
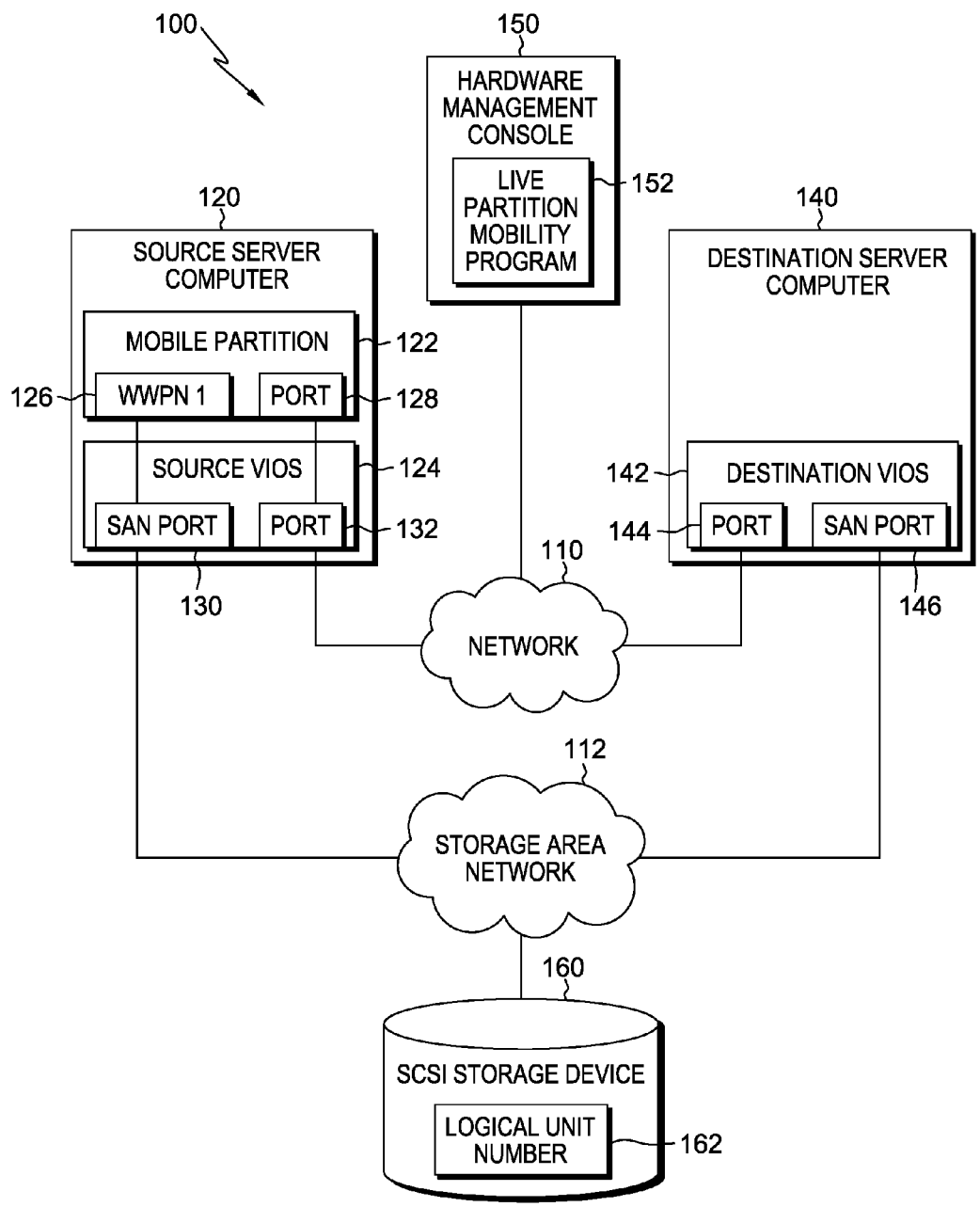
FIG. 1 is a functional block diagram illustrating a virtualized server computing environment, in accordance with an embodiment of the present invention.

Embodiments of the present invention will now be discussed with reference to the several Figures. FIG. 1 is a functional block diagram illustrating a virtualized server computing environment ("environment"), generally designated 100, in accordance with an exemplary embodiment of the present invention. Environment 100 includes source server computer 120, destination server computer 140, and hardware management console 150, all interconnected via network 110. Environment 100 also includes small system computer interface (SCSI) storage device 160, which is connected to source server computer 120 and destination server computer 140 via storage area network 112.

Network 110 can be, for example, a local area network (LAN), a wide area network (WAN), such as the Internet, a dedicated short range communications network, or any combination thereof, and may include wired, wireless, fiber optic, or any other connection known in the art. In general, the communication network can be any combination of connections and protocols that will support communication between source server computer 120, destination server computer 140, and hardware management console 150. In the exemplary embodiment depicted in FIG. 1, network 110 represents connections between source server computer 120, destination server computer 140, and hardware management console 150 using standard Ethernet connections.

Storage area network 112 can be, for example, an advanced technology attachment over Ethernet network (ATA over Ethernet or AoE), a Fibre channel protocol network, an enterprise systems connection (ESCON), a Fibre channel over Ethernet (FCoE), an HyperSCSI network, or any other type of storage area network which supports the use of the SCSI-3 protocol for communication between server computers (e.g., source server computer 120 and destination server computer 140) and storage area network devices (e.g., SCSI storage device 160). In the exemplary embodiment of FIG. 1, storage area network 112 is a Fibre channel protocol that maps SCSI-3 over a Fibre channel standard connection.

In various embodiments of the present invention, source server computer 120, destination server computer 140, and hardware management console 150 can each be a server, a laptop computer, a tablet computer, a netbook computer, a personal computer (PC), or a desktop computer. In another embodiment, source server computer 120, destination server computer 140, and hardware management console 150 represent one or more computing systems utilizing clustered computers and components to act as a single pool of seamless resources when accessed via network 110. In general, hardware management console 150 can be any computing device or a combination of devices capable of executing and having access to live partition mobility program 152. Hardware management console 150 may include internal and external hardware components, as depicted and described in further detail with respect to FIG. 5.

Source server computer 120 includes mobile partition 122 and source virtual input/output server (VIOS) 124. Mobile partition 122 is a virtual computing environment. In the exemplary embodiment, mobile partition 122 represents a virtual machine, or logical partition (LPAR), which is a software-based emulation of a computer. Mobile partition 122 can be a system LPAR, in which a complete system platform supports the execution of a complete operating system, including using virtualized hardware (e.g., virtualized I/O ports). In various embodiments of the present invention, source server computer 120 can include one or more LPARs, and one or more mobile partitions, which are specific LPARs that are subject to an imminent live partition mobility operation in which the mobile partition is moved from a source server computer (e.g., source server computer 120) to a destination server computer (e.g., destination server computer 140). In general, mobile partition 122 can be any LPAR that can access SCSI storage device 160 via storage area network 112 and can undergo an LPM operation from a source server computer (e.g., source server computer 120) to a destination server computer (e.g., destination server computer 140), in accordance with embodiments of the present invention.

Mobile partition 122 includes WWPN 1 126 and port 128. WWPN 1 126 is a virtual port used by mobile partition 122 to communicate with SCSI storage device 160 via storage area network 112. In the exemplary embodiment, WWPN 1 126 is a virtual Fibre channel port that mobile partition 122 generates for use in a virtual Fibre channel fabric, and identified by the name "WWPN 1". In general, WWPN 1 126 can have any unique identifier used to denote the virtual port in a mobile partition (e.g., mobile partition 122) on a source server computer (e.g., source server computer 120). Port 128 is a virtual port in a mobile partition that facilitates communication between mobile partition 122 and other computer systems (e.g., hardware management console 150 and destination server computer 140). In the exemplary embodiment, port 128 is a virtual Ethernet port that supports communication between mobile partition 122 and other computer systems (e.g., hardware management console 150 and destination server computer 140) via network 110. In general, port 128 can be any virtualized port utilized by mobile partition 122 to communicate with computer systems via network 110.

Source VIOS 124 is a virtualized I/O server which allows source server computer 120 to generate one or more "virtual" I/O ports, which correspond to one or more physical ports. In the exemplary embodiment of FIG. 1, source VIOS 124 uses virtual networking to map one or more physical ports on source server computer 120 (e.g., port 132) to one or more LPARs (e.g., mobile partition 122) via one or more virtual ports (e.g., port 128). In general, source VIOS 124 can be implemented with any technology that enables one physical network adapter (such as a network adapter card, or Ethernet port) to simulate multiple virtual network adapters that are compatible with one or more LPARs (e.g., mobile partition 122) on a source server computer (e.g., source server computer 120).

Source VIOS 124 includes SAN port 130 and port 132. In the exemplary embodiment of FIG. 1, SAN port 130 is a physical port that facilitates communication between mobile partition 122 and SCSI storage device 160 via storage area network 112. In this embodiment, SAN port 130 is a physical Fibre channel port that communicates with mobile partition 122 via a virtual Fibre channel connection addressed to WWPN 1 126, which is a virtual Fibre channel port within mobile partition 122. In general, SAN port 130 can be any physical port that facilitates communication between an LPAR on a source server computer and one or more SCSI storage devices via a storage area network.

Port 132 is a physical port in source server computer 120. In the exemplary embodiment, port 132 is a physical Ethernet port that supports communication between mobile partition 122 via communication with port 128 and other computer systems (e.g., hardware management console 150 and destination server computer 140) via network 110. In general, port 132 can be any physical port in a source server computer that can facilitate communication between an LPAR and other computer systems via network 110.

Destination server computer 140 includes destination VIOS 142. In the exemplary embodiment, destination VIOS 142 is a virtualized I/O server which allows destination server computer 140 to generate one or more "virtual" I/O ports, which correspond to one or more physical ports. In the exemplary embodiment of FIG. 1, destination VIOS 142 uses virtual networking to map one or more physical ports on destination server computer 140 (e.g., Ethernet) to one or more LPARs (not shown) via one or more virtual ports. In various embodiments of the present invention, destination VIOS 142 can utilize one or more physical ports to facilitate communication between a copy of mobile partition 122 that is transferred from source server computer 120 to destination server computer 140 via an LPM operation and other computing or storage systems. In some embodiments, destination VIOS 142 includes the same types of physical ports as source VIOS 124 (e.g., port 144 is of the same type as port 132 (Ethernet)). In general, destination VIOS 142 can be any technology that enables one physical network adapter (such as a network adapter card, or Ethernet port) to simulate multiple virtual network adapters that are compatible with one or more LPARs on a destination server computer (e.g., destination server computer 140).

Destination VIOS 142 includes port 144 and SAN port 146. In the exemplary embodiment of FIG. 1, port 144 is a physical port in destination server computer 140 and facilitates communication between destination server computer 140 and source server computer 120 and hardware management console 150 via network 110. As such, in the exemplary embodiment, port 144 is of the same type as port 132 (i.e., Ethernet). In general, port 144 can be any type of physical port which corresponds to a physical port in a destination server computer and facilitates communication between the destination server computer and a source server computer and a hardware management console via a network. In the exemplary embodiment of FIG. 1, SAN port 146 is a physical port on destination server computer 140 that can facilitate communication between a copy of mobile partition 122 transferred to destination server computer 140 via an LPM operation and SCSI storage device 160 via storage area network 112. In the exemplary embodiment, SAN port 146 is a Fibre channel port that can communicate with a copy of mobile partition 122 on destination server computer 140 (not shown) via a virtual connection addressed to a virtual port identified by a secondary WWPN (not shown). In general, SAN port 146 can be any physical port that facilitates communication between an LPAR on a destination server computer and one or more SCSI storage devices via a storage area network.

Hardware management console 150 is a computer hardware system used to manage the software configuration and operation of one or more LPARs within environment 100. Hardware management console 150 includes live partition mobility program 152. Live partition mobility program 152 directs the transfer of mobile partition 122 from source server computer 120 to destination server computer 140 through an LPM operation which utilizes SCSI-3 persistent reservations to manage reservations held by mobile partition 122 on one or more logical units (e.g., SCSI storage device 160).

SCSI storage device 160 is a dedicated storage device that exists within a storage area network (e.g., storage area network 112) and supports communication using the SCSI-3 standard. In the exemplary embodiment, SCSI storage device 160 is a dedicated storage device, such as a disk array, tape library, or optical jukebox. In general, SCSI storage device 160 can be any storage unit that is capable of receiving and responding to SCSI-3 standard commands and supports read/write operations, in accordance with embodiments of the present invention. In the exemplary embodiment, SCSI storage device 160 is identified by a logical unit number, such as logical unit number 162. In the exemplary embodiment, logical unit number 162 is a number used to address the physical SCSI storage device using SCSI standard protocols (e.g., SCSI-3). In this embodiment, one or more server computers (e.g., source server computer 120 and destination server computer 140) can place a reservation on SCSI storage device 160, as identified by logical unit number 162, using SCSI-3 persistent reservations. In general, logical unit number 162 can be any number used to identify an SCSI storage device or a logical unit (i.e., subdivision) thereof.

Figure 2:
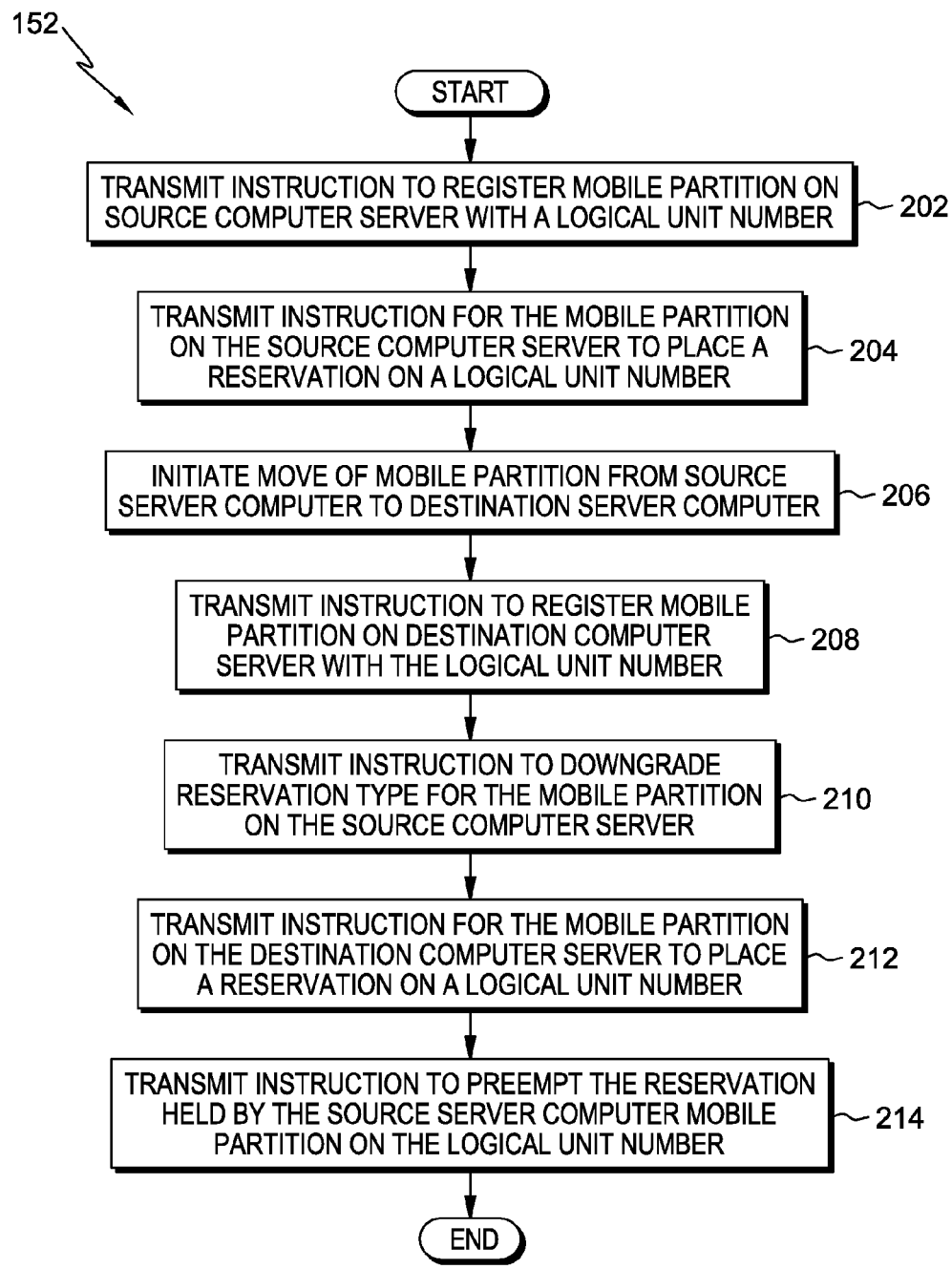
FIG. 2 is a flowchart depicting operational steps of a live partition mobility program, on a hardware management console within the environment of FIG. 1, in accordance with an embodiment of the present invention.

FIG. 2 is a flowchart depicting operational steps of live partition mobility program 152, on hardware management console 150 within the environment 100, in accordance with an embodiment of the present invention. The steps of the flowchart described in FIG. 2 represent a series of computer executed steps following the initiation of an LPM operation within environment 100 by, for example, a network administrator.

Live partition mobility program 152 transmits an instruction via network 110 to register mobile partition 122, on source server computer 120, with logical unit number 162 (step 202). In the exemplary embodiment depicted in FIG. 1, live partition mobility program 152 transmits an instruction to source server computer 120 to transmit, via storage area network 112, a registration command for mobile partition 122 to register a reservation key with SCSI storage device 160, which is identified by logical unit number 162. In the exemplary embodiment, the copy of mobile partition 122 on source server computer 120 uses the SCSI-3 standards to issue the registration request using WWPN 1 126. In SCSI-3, persistent reservation protocols use a concept of registration and reservation to manage multiple reservations on a single SCSI storage device. Each host system (e.g., source server computer 120 and destination server computer 140) on storage area network 112 can register one or more reservation keys with SCSI storage device 160 using commands and service actions. A service action is a command field that contains a coded value identifying a function to be performed under the more general command. The act of registration allows registered server computers to place reservations on specific SCSI storage devices (e.g., SCSI storage device 160) associated with a logical unit number (e.g., logical unit number 162). In one embodiment, source server computer 120 transmits an SCSI-3 "PERSISTENT RESERVE OUT" command with a "REGISTER" service action in order to register a unique reservation key (e.g., "rk1") with SCSI storage device 160.

Live partition mobility program 152 transmits an instruction, via network 110, to mobile partition 122, on source server computer 120, to place a reservation on logical unit number 162, which is associated with SCSI storage device 160 (step 204). In the exemplary embodiment, live partition mobility program 152 instructs mobile partition 122 to issue a SCSI-3 "PERSISTENT RESERVE OUT" command with a "RESERVE" service action. In various embodiments, the "RESERVE" service action creates a persistent reservation having a specific scope and type. The persistent reservation scope designates that the persistent reservation applies to a complete logical unit (e.g., SCSI storage device 160, designated by logical unit number 162). The persistent reservation type designates the access restrictions for each host (both registered and unregistered) with respect to the logical unit number on which the persistent reservation was placed. In the exemplary embodiment, mobile partition 122 transmits, using WWPN 1 126 and storage area network 112, a reservation request, where the reservation scope extends to the entire storage device designated by logical unit number 162, and where the type is set to "Write Exclusive-Registrants Only" (WERO). In the SCSI-3 standard, the WERO reservation type indicates that only certain commands (e.g., media-access write commands) are only allowed for registered host systems (e.g., mobile partition 122), and that there is only one persistent reservation holder (i.e., mobile partition 122). The result of mobile partition 122 placing the WERO persistent reservation on logical unit number 162 is that only mobile partition 122 holds a persistent reservation on logical unit number 162 and has certain exclusive privileges.

Live partition mobility program 152 initiates the move of mobile partition 122 from source server computer 120 to destination server computer 140 (step 206). In the exemplary embodiment depicted in FIG. 1, live partition mobility program 152 instructs hardware management console 150 to perform requisite verifications and validations regarding source server computer 120 and destination server computer 140, such as ensuring that any shared resource pools are created on destination server computer 140, ensuring that destination server computer 140 has sufficient available memory to support mobile partition 122, and ensuring that destination server computer 140 has sufficient available processors to support mobile partition 122. In the exemplary embodiment, following verification of the destination server computer configuration, hardware management console 150 transmits instructions to source server computer 120 to transfer a copy of mobile partition 122 to destination server computer 140. Once necessary components of mobile partition 122 are copied to destination server computer 140, the copy of mobile partition 122 on destination server computer 140 begins running. In one embodiment, hardware management console 150 instructs destination server computer 140 to map the secondary WWPN that is associated with the copy of mobile partition 122 on destination server computer 140 to SAN port 146, so that the copy of mobile partition 122 on destination server computer 140 can communicate with SCSI storage device 160 via storage area network 112.

Live partition mobility program 152 transmits an instruction, via network 110, to destination server computer 140 to register the copy of mobile partition 122 on destination sever computer 140 with logical unit number 162 (step 208). In the exemplary embodiment, the instructions direct the copy of mobile partition 122 on destination sever computer 140 to transmit a registration command to SCSI storage device 160. In this embodiment, the copy of mobile partition 122 on destination sever computer 140 transmits a "PERSISTENT RESERVATION OUT" command with a "REGISTER" service action. The transmitted command registers a unique reservation key (e.g., "rk2") with SCSI storage device 160, which is identified by logical unit number 162. The copy of mobile partition 122 on destination server computer 140 uses the secondary WWPN, which is virtually connected to SAN port 146 (i.e., the physical port), to communicate with SCSI storage device 160. By registering a unique reservation key with SCSI storage device 160, the copy of mobile partition 122 on destination server computer 140 can place reservations on the SCSI storage device 160.

Live partition mobility program 152 transmits an instruction to mobile partition 122, on source server computer 120, to downgrade the reservation type of the reservation held by mobile partition 122 on SCSI storage device 160 (step 210). In the exemplary embodiment, live partition mobility program 152 instructs mobile partition 122, on source server computer 120, to transmit an instruction to SCSI storage device 160 to retrieve a list of those unique reservation keys currently held on SCSI storage device 160. Mobile partition 122 can, for example, receive the unique reservation key that was registered by the copy of mobile partition 122 on destination server computer 140, and compare it with the list of reservation keys currently held on SCSI storage device 160 in order to determine that the copy of mobile partition 122 on destination server computer 140 successfully established a reservation on SCSI storage device 160. In the exemplary embodiment, mobile partition 122, on source server computer 120, transmits an SCSI-3 standard "PRE-EMPT" command with a service action reservation key specified to be the unique reservation key associated with mobile partition 122 (i.e., "rk1") and redefining the type of reservation key to "Write Exclusive-All Registrants" ("WEAR"). In the SCSI-3 standard, the WEAR reservation type restricts certain actions (e.g., media access write commands) to only registered systems. However, the WEAR type is distinct from the WERO type, in that multiple hosts (e.g., source server computer 120 and destination server computer 140) can simultaneously hold reservations on the SCSI storage device (e.g., SCSI storage device 160). By allowing multiple host systems to hold simultaneous reservations on a single logical unit, live partition mobility program 152 enables an LPM operation to occur without necessitating a release of a reservation from the source server computer and then a reacquisition of the reservation by the destination server computer.

Live partition mobility program 152 transmits instructions to destination server computer 140 instructing the copy of mobile partition 122 on destination server computer 140 to place a reservation on logical unit number 162, which is associated with SCSI storage device 160 (step 212). In the exemplary embodiment, the copy of mobile partition 122 on destination server computer 140 transmits, using the secondary WWPN assigned to mobile partition 122 and the unique reservation key held by the copy of mobile partition 122 on destination server computer 140, an SCSI-3 standard "PERSISTENT RESERVATION OUT" command with a "RESERVE" service action that establishes a reservation with type WEAR. Following the execution of step 212, both mobile partition 122 on source server computer 120 and the copy of mobile partition 122 on destination server computer 140 hold persistent reservations on logical unit number 162, which is associated with SCSI storage device 160, permitting access to SCSI storage device 160 through both source server computer 120 and destination server computer 140.

Live partition mobility program 152 transmits an instruction to the copy of mobile partition 122 on destination server computer 140 via network 110 to preempt the reservation held by mobile partition 122 on source server computer on logical unit number 162 (step 214). In the exemplary embodiment, the copy of mobile partition 122 on destination server computer 140 transmits, using the alternate WWPN assigned to mobile partition 122 and the unique reservation key held by the copy of mobile partition 122 on destination server computer 140, a SCSI-3 standard "PERSISTENT RESERVATION OUT" command with a "PREEMPT" service action with the service action reservation key set to zero, and the type set to WERO. In the exemplary embodiment, the "PREEMPT" service action with the service action reservation key set to zero removes all registrants (i.e., mobile partition 122 on source server computer 120) except for the registrant issuing the preempt command service action (copy of mobile partition 122 on destination server computer 140). After completion of the LMP operation, mobile partition 122 can be removed from source server computer 120 without resulting in any interruption to the availability of mobile partition 122. Accordingly, by performing the steps of FIG. 2, a copy of mobile partition 122 is migrated from source server computer 120 to destination server computer 140 using shared persistent reservations so that mobile partition 122 maintained a reservation on logical unit number 162 throughout the migration.

Figure 3:
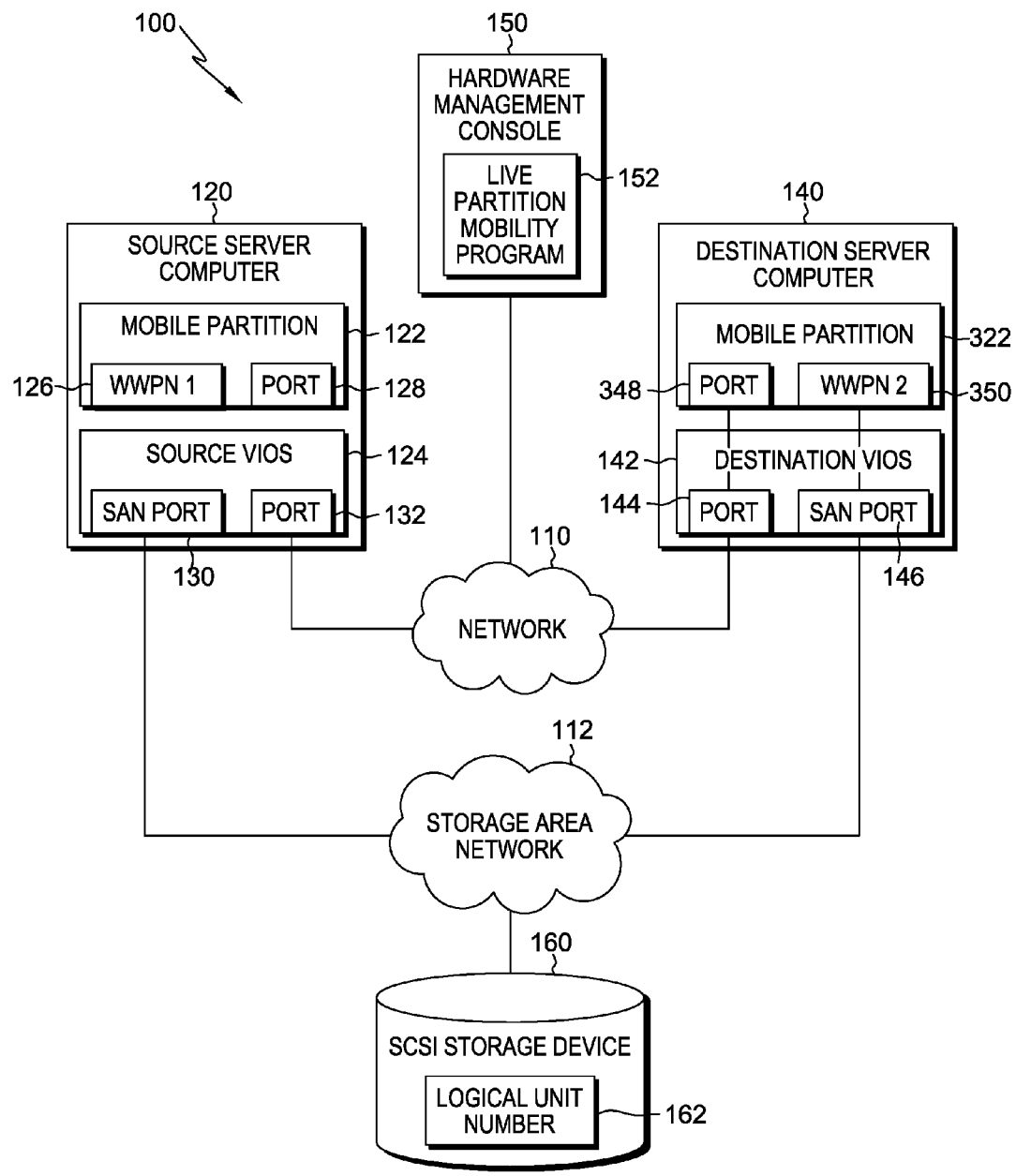
FIG. 3 is a functional block diagram illustrating a virtualized server computing environment during a live partition mobility operation, in accordance with an embodiment of the present invention.

FIG. 3 is a functional block diagram illustrating environment 100, in accordance with an embodiment of the present invention. Specifically, FIG. 3 depicts environment 100 at a specific point in time during the LPM operation after hardware management console 150 generates a copy of mobile partition 122 on destination server computer 140 (i.e. following the execution of step 206 in FIG. 2). The copy of mobile partition 122 on destination server 140 is generally designated as mobile partition 322. As part of the LPM operation, mobile partition 322 generates its own virtual port connections with destination VIOS 142. In the depicted embodiment, mobile partition 322 generates port 348 to virtually communicate with port 144. In the depicted embodiment, port 348 is a virtual Ethernet port that supports communication between mobile partition 322 and other computer systems (e.g., hardware management console 150 and source server computer 120) via network 110. In general, port 348 can be any virtualized port utilized by mobile partition 322 to communicate with computer systems via network 110. Mobile partition 322 also includes WWPN 2 350. As discussed above, each LPAR is assigned two WWPNs (a primary WWPN and a secondary WWPN) to communicate with devices via storage area network 112. In the depicted embodiment, WWPN 2 350 represents a virtualized port (e.g., virtual Fibre channel port) that is identified by the secondary WWPN originally assigned to mobile partition 122. WWPN 2 350 can be used to communicate with SCSI storage device 160 via storage area network 112 on behalf of mobile partition 322 while mobile partition 122 uses WWPN 1 126 to communicate with SCSI storage device 160 via storage area network 112. Once mobile partition 122 is removed from source server computer 120, WWPN 2 350 becomes the primary WWPN associated with mobile partition 322, while WWPN 1 126 becomes the secondary WWPN associated with mobile partition 350.

Figure 4:
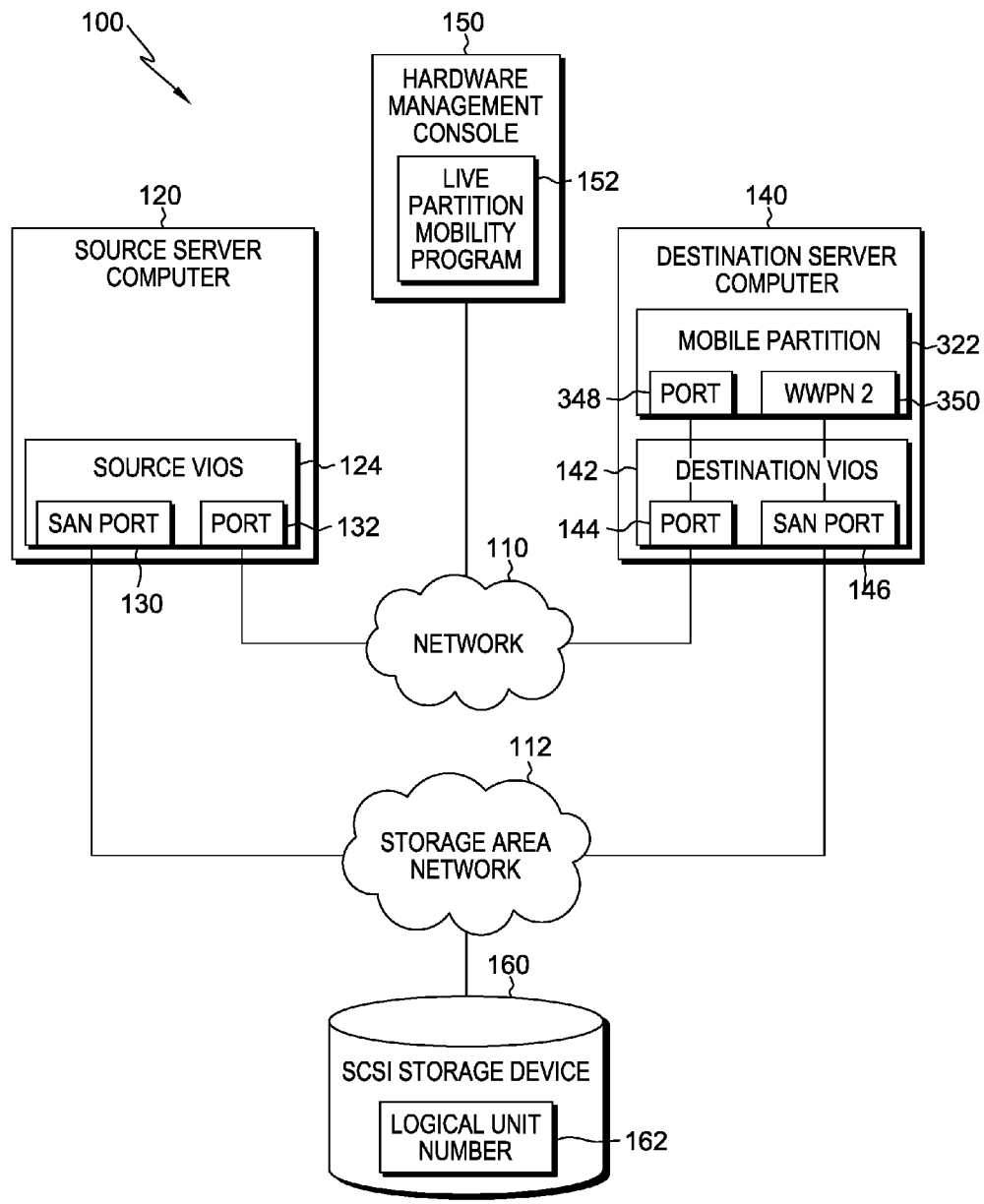
FIG. 4 is a functional block diagram illustrating a virtualized server computing environment following a live partition mobility operation, in accordance with an embodiment of the present invention.

FIG. 4 is a functional block diagram illustrating environment 100, in accordance with an embodiment of the present invention. In the depicted embodiment, the LPM operation has completed, and hardware management console 150 removes mobile partition 122 from source server computer 120. In the depicted embodiment, WWPN 2 350 is the primary WWPN associated with mobile partition 322, while WWPN 1 126 (not shown) becomes the secondary WWPN associated with mobile partition 350.

Figure 5:
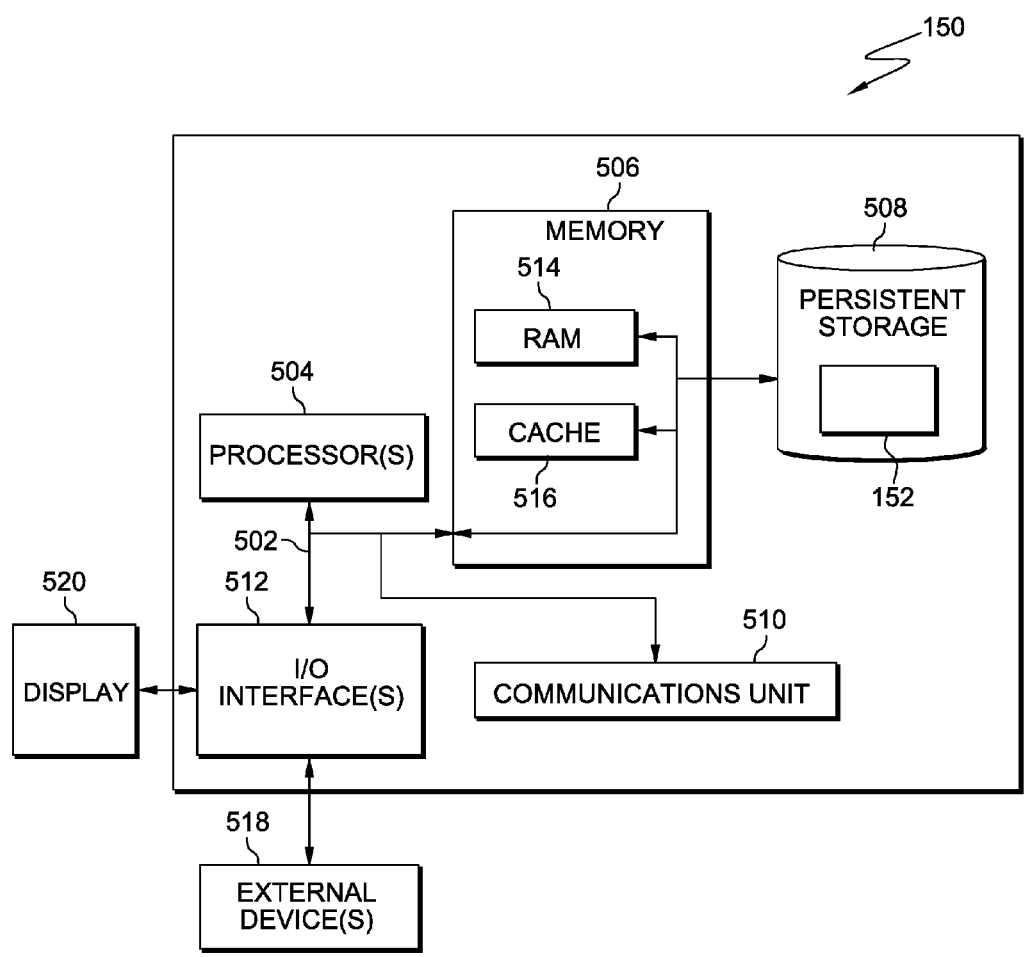
FIG. 5 depicts a block diagram of components of the hardware management console executing the live partition mobility program, in accordance with an embodiment of the present invention.

FIG. 5 depicts a block diagram of components of hardware management console 150 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Hardware management console 150 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer readable storage media.

Live partition mobility program 152 is stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of source server computer 120, destination server computer 140, and SCSI storage device 160. In these examples, communications unit 510 includes one or more network interface cards. Communications unit 510 may provide communications through the use of either or both physical and wireless communications links. Live partition mobility program 152 may be downloaded to persistent storage 508 through communications unit 510.

I/O interface(s) 512 allows for input and output of data with other devices that may be connected to hardware management console 150. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., live partition mobility program 152, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for transferring a logical partition from a source server to a destination server, the method comprising:
   registering, by one or more computer processors, a first instance of a logical partition on a source server with a logical unit;
   placing, by one or more computer processors, a first persistent reservation on the logical unit, wherein the first persistent reservation indicates that only the first instance of the logical partition can hold a reservation on the logical unit;
   registering, by one or more computer processors, a second instance of the logical partition on a destination server with the logical unit, wherein the logical unit is connected to the source server and the destination server over a storage area network, and wherein the first instance of the logical partition communicates with the logical unit using a first virtual port having a primary world wide port name, and wherein the second instance of the logical partition communicates with the logical unit using a second virtual port having an alternative world wide port name;
   downgrading, by one or more computer processors, the first persistent reservation, such that the first and second instances of the logical partition can hold persistent reservations on the logical unit;
   placing, by one or more computer processors, a second persistent reservation on the logical unit, wherein the second instance of the logical partition holds the second persistent reservation on the logical unit;
   removing, by one or more computer processors, the first persistent reservation from the logical unit, wherein removing the first persistent reservation comprises the second instance of the logical partition preempting the first persistent reservation;
   removing, by one or more computer processors, the first instance of the logical partition from the source server; and
   upgrading, by one or more computer processors, the second persistent reservation, such that only the second instance of the logical partition holds a persistent reservation on the logical unit.

* * * * *